Oct. 7, 1969     W. W. BUECHNER     3,470,810
WATER JACKET AND PHOTOGRAPHIC PROCESSING APPARATUS
Filed Jan. 23, 1967     4 Sheets—Sheet 1

INVENTOR.
Werner W. Buechner

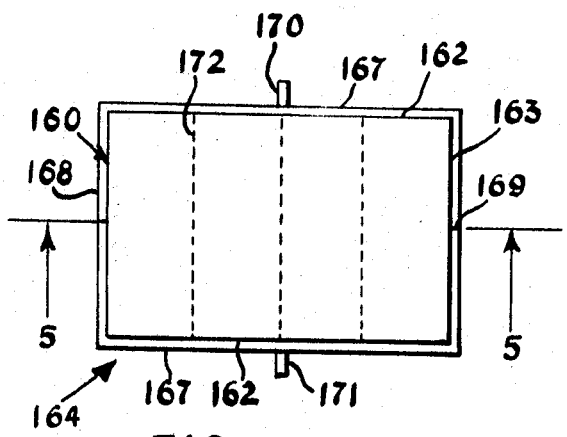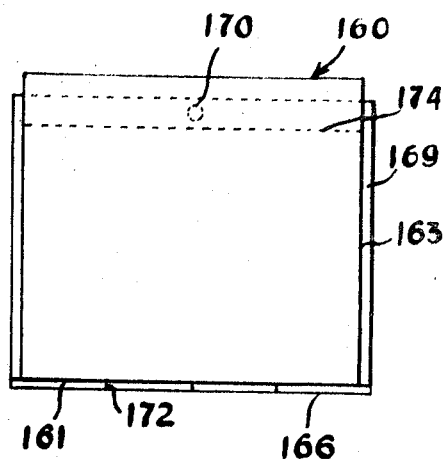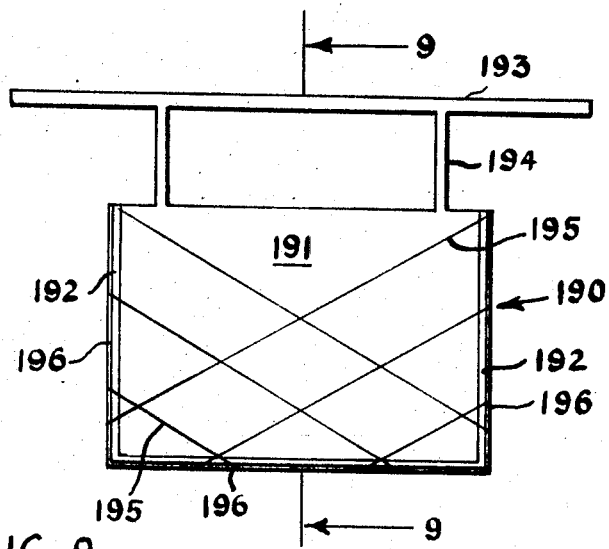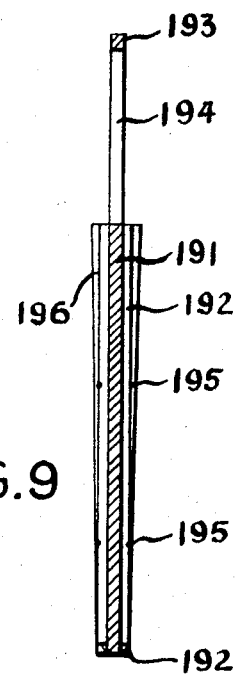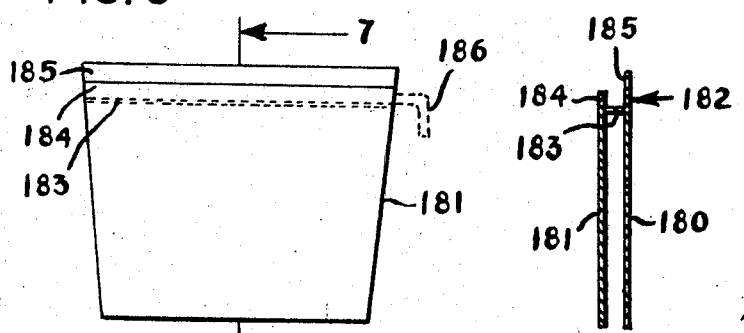

Oct. 7, 1969 W. W. BUECHNER 3,470,810
WATER JACKET AND PHOTOGRAPHIC PROCESSING APPARATUS
Filed Jan. 23, 1967 4 Sheets-Sheet 4
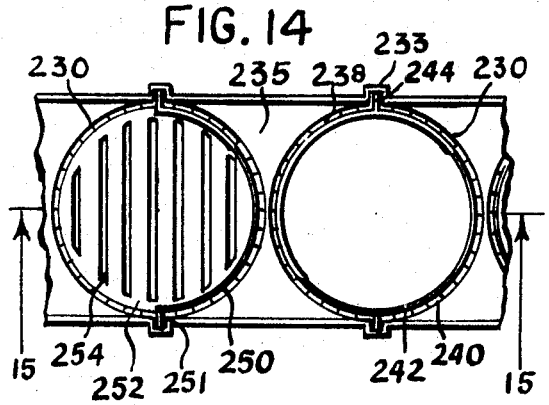
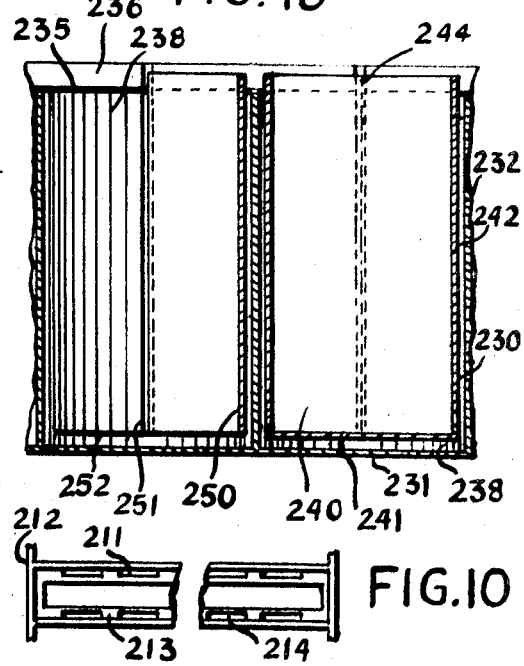
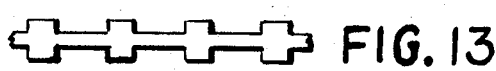
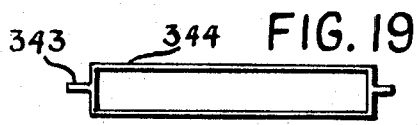
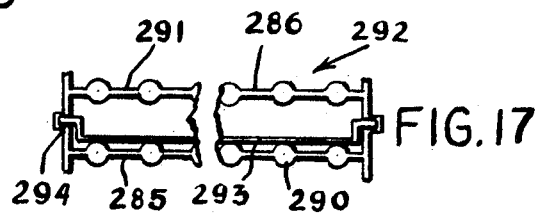
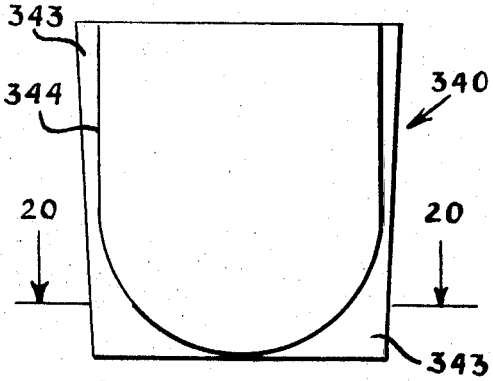
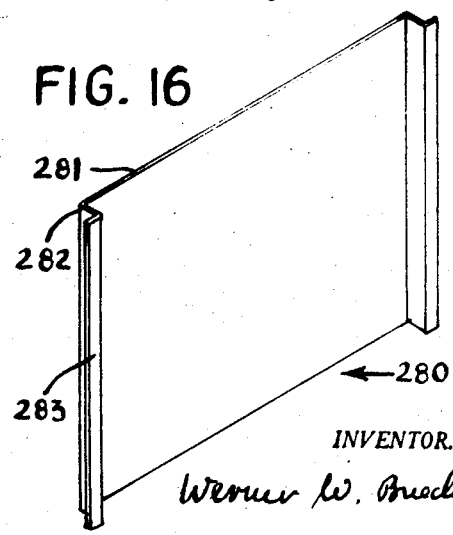
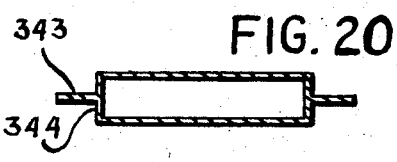
INVENTOR.
Werner W. Buechner

United States Patent Office 3,470,810
Patented Oct. 7, 1969

3,470,810
WATER JACKET AND PHOTOGRAPHIC PROCESSING APPARATUS
Werner W. Buechner, 4407 Gladding Court, Midland, Mich. 48640
Continuation-in-part of applications Ser. No. 52,524, Aug. 29, 1960; Ser. No. 342,028, Feb. 3, 1964; Ser. No. 342,030, Feb. 3, 1964; Ser. No. 342,459, Feb. 4, 1964; Ser. No. 350,612, Mar. 9, 1964; and Ser. No. 530,244, Feb. 14, 1966. This application Jan. 23, 1967, Ser. No. 632,842
Int. Cl. G03d 3/02
U.S. Cl. 95—96    10 Claims

ABSTRACT OF THE DISCLOSURE

A compartmented water jacket comprising separatory walls which form water-tight working compartments in the water jacket. Chemical treating tanks and interspersed thereinbetween means establishing washing locations are disposed in the working compartments in such manner, that a stream of water passes in a vertical zig-zag pattern around and under each of the chemical treating tanks and through the washing locations. The washing locations comprise on the downstream side separatory walls horizontal troughs with closeable drainage means which permit the disposal of the contaminated wash water at the location where it is formed.

---

This invention relates to photographic processing equipment and more particularly to processing equipment for the development of photographic color materials.

RELATED APPLICATIONS

This application is a continuation-in-part of my copending application Ser. No. 52,524, now Patent No. 3,326,649, filed Aug. 29, 1960, entitled Photographic Process and Apparatus and of my copending application Ser. No. 350,-612, now Patent No. 3,349,689, filed Mar. 9, 1964 entitled Photographic Process and Apparatus. The present application is also a continuation-in-part of my copending application Ser. No. 342,459, now Patent No. 3,349,-686, filed Feb. 4, 1964 and entitled Photographic Process and Apparatus. The present application is furthermore a continuation-in-part of my copending applications Ser. No. 342,028, now abandoned filed Feb. 3, 1964 entitled Carrier for Photographic Materials and Ser. No. 342,030, now Patent No. 3,373,674, filed Feb. 3, 1964, entitled Photographic Wash Vessel. The present application is also a continuation-in-part of my copending application Ser. No. 530,244 now abandoned, filed Feb. 14, 1966 and entitled Photographic Method and Apparatus.

BASIS OF THE INVENTION

In my Patent No. 3,236,649 is described and claimed a process for the development of photographic materials in which the chemical treating solutions are maintained at the accurate treating temperature by flowing temperature conditioning water in form of a wide, thin stream successively around the chemical tanks. The flowing stream of water may also be used as the washing water in the intermediate and/or final washing steps. Suitable apparatus and equipment for carrying out this process is described and claimed in my copending applications Ser. Nos. 342,198, now Patent No. 3,362,315; 342,028; 342,-029, now Patent No. 3,349,688; 342,030; 342,197, now Patent No. 3,337,714; 342,459; 350,612 and in other pending applications and in my Patent 3,124,051.

This process and equipment works very satisfactorily in the concurrent flow method, if the rate of forwarding of the photographic material to be treated is at least slightly lower than the flow rate in horizontal vector, of the stream of temperature conditioning water and washing water.

If the forwarding rate of the photographic material exceeds that of the flowing water, it is possible to provide clean, fresh wash water in each intermediary and final washing step by running the water countercurrently to the forwarding direction of the photographic material. However, in this case, the first steps of the process, which usually require the closest temperature control, receive the temperature conditioning water after it has already passed and controlled the temperature in all the latter steps. With this mode of operation, it is also necessary to wait, before starting a new batch of material, until the contaminated wash water from the last washing step has passed through the processor, with due consideration given to the length of the first treating step preceding the first washing step in the process sequence. The present invention provides new process and apparatus which overcome these disadvantages.

It is therefore an object of the present invention to provide improved apparatus for the development of photographic materials and especially of multilayer color materials.

Another object of the invention is the provision of improved developing and treating apparatus for photographic materials and especially color materials, which provides in a multiplicity of washing and rinsing locations fresh running wash water.

Still another object is the provision of various improvements which are useful in photographic processing apparatus and which greatly contribute to the compactness, effectiveness, convenience and versatility of such processing apparatus.

Other objects of the invention will become apparent from the following description of the invention and from the accompanying drawings.

SUMMARY OF THE INVENTION

The objects of the invention are achieved by a water jacket and by photographic processing equipment containing a water jacket, which water jacket comprises a receptacle; arranged therein separatory walls so as to form a multiplicity of essentially water-tight working compartments in said water jacket; and horizontally or essentially horizontally disposed on separatory walls of the water jacket channel-like trough means being open at the top and comprising closeable drainage means, so as to permit the disposal of the contaminated wash water at the locations where it occurs in the water jacket during the practice of the development of photographic material in the equipment. In this manner only clean, fresh water is passed through the processing equipment providing fresh water in all washing locations at all times.

The trough means comprise an upstream wall and a downstream wall. Preferably the upstream wall of the trough extends with its upper edge to a level somewhat lower than the downstream wall.

In a preferred embodiment of the novel processing equipment and of the novel water jacket of the present invention, the working compartments are arranged in two independent sections, one containing the chemical tanks requiring close temperature control, e.g. within ½ ° F. and the other section containing the chemical tanks requiring less accurate temperature control, e.g. within plus/minus 2° F., and the washing locations. In the former section, the water is run, during the operation, preferably concurrently with the direction of forwarding of the photographic material to be processed to provide the most accurate temperature control. The water is run preferably countercurrently in the latter section to provide the advantage of the provision of clean, fresh wash water in each intermediary and final washing step.

DRAWINGS

Referring to the accompanying drawings, FIGS. 1 and 2 are schematic representations of photographic developing apparatus of the present invention employing a circulated stream of water for the temperature conditioning. FIG. 1 is a top plan view, FIG. 2 is a vertical length section.

FIGS. 4 and 5 are schematic representations of jacketed tanks which may also be used to establish the above said vertical zig-zag flow pattern of the flowing widespread stream of temperature conditioning water in accordance with the invention. FIG. 4 is a top elevation, FIG. 5 is a vertical cross section.

FIGS. 6 and 7 represent a separatory wall, which may be used in the improved compartmented bath or water jacket, permitting the drainage of the contaminated wash water, FIG. 6 being a side elevation and FIG. 7 being a vertical cross section.

FIGS. 8 and 9 represent an improved carrier for the photographic sheet material, which carrier may be used with advantage in the apparatus of the present invention, FIGS. 14 and 15 are a top plan view and a vertical cross section.

FIG. 10 is a fragmentary top plan view of a compartment with a vessel inserted, which has spacers incorporated in its side walls and which uses its end walls as the sealing means.

FIGS. 11 to 13 represent top plan views of fragments of separatory walls having spacers of different design.

FIGS. 14 and 15 are a top plan view and a vertical length section of apparatus employing the concept of the spacers in cylindrical compartments containing inserted cylindrical vessels.

FIG. 16 is an isometric view of an improved, simplified wash vessel or washing separator, which is used to convert a compartment into a washing or rinsing location.

FIG. 17 is a fragmentary top plan view of a compartment comprising another kind of spacers and having the wash vessel of FIG. 16 inserted in operating position.

FIG. 18 is a side elevation, FIG. 19 a top plan view and FIG. 20 a horizontal section of a treating vessel which is specifically adapted for the treatment of movie film and which may be used with particular advantage in the apparatus of the present invention.

DETAILED DESCRIPTION OF THE INVENTION

Figure 1:
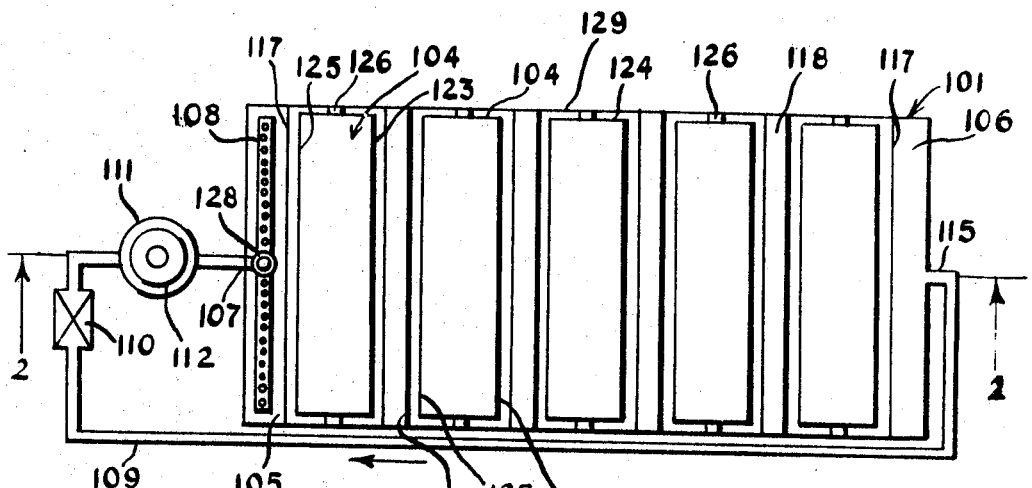

Generally, the invention concerns a process and apparatus for the multistep treatment of photographic materials at a predetermined temperature in a multiplicity of separate treating steps in different treating media, which process comprises the successive contacting of said photographic material with a multiplicity of differing treating solutions, each being in the form of an upright layer of treating medium, having two opposite essentially vertical faces, which faces may be straight, curved or half circular, and the vertical layers being arranged in spaced, side-by-side relationship, with their major vertical faces opposite to each other and preferably essentially parallel to each other, and maintaining the temperature in each of said layers at about said predetermined temperature by circulating a unidirectional stream of temperature conditioning water of about the same temperature around each of said layers of treating solution in a manner which comprises the steps of forming the water into a wide layer which is flown successively in a vertical zig-zag pattern around each of said upright layers of treating solution, continuously recirculating the water, after it has passed by the layers, readjusting the temperature of the temperature conditioning water to about said predetermined temperature to be maintained in said layers of treating solution and reforming the temperature conditioning water having the proper, adjusted temperature into a wide layer and flowing it around said upright layers of treating solutions in a vertical zig-zag pattern and so forth as described hereinbefore.

The present invention comprises also a new method for the control of the temperature of the photographic treating solutions contained in the chemical tanks of photographic developing equipment, containing the chemical tanks in spaced side-by-side relationship, which method comprises the circulation of a unidirectional stream of temperature conditioning water having about the temperature which is desired to be maintained in said chemical tanks during the treatment, successively by and around said chemical tanks, in a manner which comprises forming the circulating water into a layer which is flown in a vertical zig-zag pattern around each of said tanks such that the said stream of water flows in the case of each of said tanks in a path downwardly along one major vertical side of the tank, passes underneath the tank and thereafter flows upwardly alongside the opposite vertical major side wall of the tank whereafter the temperature of the circulating water is readjusted to about said desired treating temperature and the water is recirculated to the upstream side end and reformed into a layer and passed by the tanks in the above described manner.

The present invention provides also novel apparatus for the treatment of photographic materials, and especially of multilayer color materials which apparatus comprises a compartmented water jacket, a multiplicity of chemical tanks which are adapted to be inserted into compartments of said water jacket in sealing relationship such that an essentially water tight seal is established between the end walls of said tanks and the end walls of said compartments opposite said end walls of the tanks, optionally inlet means, outlet means and circulating means adapted to continuously circulate a stream of water through said water jacket, through the compartments of the water jacket and around the tanks contained in the compartments in a vertical zig-zag pattern in the manner described hereinbefore, and means for adjusting and readjusting the temperature of the circulating stream of water to an approximately constant, predetermined level.

The present invention comprises also novel developing apparatus, in which the compartmented bath or water jacket is divided into two separate sections, a section A and a section B whereby section A is adapted for passing the streaming temperature conditioning water concurrently, and section B is adapted for passing the streaming temperature conditioning water countercurrently with the direction of forwarding of the photographic material. Section A is adapted to receive in compartments the vessels or tanks requiring close temperature control, e.g. in the range of plus/minus ½° F. as it is required in most color processes in the first developing step. Section B is adapted to receive the vessels or tanks with the chemical solutions requiring less exacting temperature control, e.g. in the range from plus/minus 2° F. of the desired treating temperature. Section B contains also, if desired, the locations for the intermediary washing and rinsing steps. The washing locations are advantageously provided with means permitting the drainage of the streaming, contaminated wash water from the water jacket directly from each of the washing and rinsing locations. Separatory walls having at their top edges superimposed a trough-like channel or the like are excellently suited, in combination with suitable closure means, to permit drainage directly at each washing location, without distorting the vertical zig-zag flow pattern of the water stream and without disturbing the vertical flow of the wash water in the individual washing locations. The said trough-like channels are normally closed and are overflown by the widespread stream of water in the same manner as is the case with the regular separatory walls. For the drainage of the contaminated wash water from any one of the washing locations the closure means in the channel being down stream of said washing location are opened to connect the channel with the waste line. The closure means may be a removable plug, a two way cock, a valve or any other suitable device known in the art.

In each of sections A and B the temperature conditioning water is flown in a vertical zig-zag pattern around the treating vessels or chemical tanks as described hereinbefore. Likewise, the water is given a predominantly vertical flow direction in each of the washing locations. The temperature conditioning medium passing through section A may be simply circulated with readjustment to the desired temperature range by the use of a circulatory system as described hereinbefore. Section B may be fed with a continuously flowing stream of temperature conditioning water which has a temperature in the range of e.g. plus/minus 2° F. as is required in most of today's color processes. Alternatively, section A may also be fed with a continuously flowing stream of temperature conditioning water being maintained in a range which assures maintenance of the temperature in the chemical tanks or vessels in the desired plus/minus ½° F. range of the desired treating temperature. The outlet of section A may in this case be connected by tubing or the like to the inlet of section B at the other end of the water jacket or bath. This establishes the desired flow directions in each of the sections, concurrent in section A and countercurrent in section B with the use of one single stream of water, which serves first section A and which does all the temperature conditioning and which may serve at the same time as washing water in all the washing steps, assuring fresh, pure water in each washing step due to the countercurrent flow in section B.

The novel process, method and apparatus of the invention permit the maintaining of an extremely accurate constant temperature in the chemical solutions requiring this close temperature control. The invention is therefore particularly suited for the application in the development and other treatment of multilayer positive and negative color materials which require during the development an accurate temperature within very narrow ranges in at least one of the chemical solutions used for the treatment sequence. The invention is equally useful for the treatment of roll film, sheet film, movie film, of paper backed sheets and bands of direct printing or of reversal materials. The operation can be made completely automatic by the use of automatic temperature control devices such as thermostats and thermostat-controlled heaters and by automatic circulating means for the temperature conditioning water and, if desired by the use of automatic forwarding means for the photographic materials. This together with the high efficiency and accuracy in the control of the temperature in the chemical solutions and in the washing make the invention particularly useful in the application in commercial, large scale, batch operated equipment for the development of color materials of all descriptions and makes.

The photographic material is generally inserted into the treating solutions in a vertical orientation or in an essentially vertical orientation, i.e. the sheets stand on edge and the bands and films are suspended. Any other mode of orienting the material, e.g. in form of spirals or coils or reels of long bands of roll film or movie film or in any other desired form in a horizontal or vertical orientation of the spirals, reels or coils are also possible. The chemical treating solutions are advantageously arranged in one row or in two or three parallel rows or in a full or partial circle, in an order which corresponds to the sequence of the steps in the process in which they are used so that the film material can advantageously be forwarded from one tank to the next. Preferably, the washing locations for the washing and rinsing steps are interspersed between the chemical tanks in an order as they occur in the process sequence to be carried out.

The predetermined temperature which is to be maintained in the treating solutions is generally the temperature prescribed by the manufacturer of the photographic materials and/or of the treating chemicals used. In exceptional cases, one may use, with proper adjustment of treating times and conditions, temperatures other than those prescribed by the manufacturer of the materials. The term "temperature conditioning medium" or "temperature conditioning water" designates a liquid medium which has been brought approximately to the temperature at which the photographic process is to be carried out. The permissible deviation from that mean temperature depends somewhat on the accuracy and constancy of the temperature required in the treating solutions. Different steps in different processes require different degrees of accuracy as has been set out hereinbefore.

Flowing a continuous or circulated stream of temperature conditioning water having about the required mean temperature required for the treatment is the most accurate mode of keeping the temperature at a prescribed or desired level and is far superior to stagnant or stirred baths as they are used in the conventional water jacket principle. The new principle of the flowing of circulated temperature conditioning medium flowing in a vertical zig-zag pattern around the treating vessels or tanks permits operation for many hours without a need for further adjustments of the temperature in the vessels or tanks. The temperature conditioning medium is usually water, which may then also serve as the washing medium in one or more washing steps.

The terms "vessel," "treating vessel," "tanks" and "chemical tanks" are used interchangeably in the description of the invention and are intended to designate the containers in which the chemical solutions or other treating media are retained. The tanks or vessels may have any desired size and include vessels containing or holding one quart or less of treating solutions as well as the commercial size equipment which has a capacity of 1 gallon, 3½ gallons, 50 gallons, 100 gallons or more. In fact, the benefits of the invention are best realized with the larger size equipment over the methods and designs presently in use.

Other terms used in the specification have the general meaning and definition as they are given in the above mentioned copending applications and particular also in my copending application Ser. No. 350,612 of which special reference is made herewith.

In order to make possible the treatment of larger quantities of material, and particularly also the treatment of the photographic material in vertical orientation, such as roll films suspended in form of open bands or strips or sheets standing on edge, the treating solutions are advantageously used in form of an upright, vertical layer in which the vertical dimension is preferably greater than the length of the bands of film suspended therein or of the vertical extension of the standing sheets so that the material is completely submerged when it is inserted in the solutions. Preferably, the upright vertical layer has the form of a parallelepiped, as it is obtained in the commercially available, conventional tanks. The term includes also other forms derived therefrom, e.g. those having one or two trapezoidal vertical cross sections, e.g. layers which are wider at the top than at the bottom.

The term "major vertical faces" refers to the vertical sides of the layer which are opposite to the vertical sides of the neighbouring layer when the layers are arranged in a spaced side-by-side relationship. Usually, and preferably the major vertical faces are the largest vertical sides of the layer.

The temperature conditioning water, having approximately the desired treating temperautre is formed into a thin layer when it is flown along the major vertical faces of the layers of treating solution or along the opposite vertical major sides of the tanks or vessels, respectively. The term "thin layer" is intended to mean that the stream of flowing water is much wider than it is thick. In practice, the streaming water is preferably spread out to a width equalling or surpassing the width of the major faces or major vertical sides of the tanks, respectively, along which it is flown. Preferably, the layer is made very thin. The preferred thickness depends in part on the liquid capacity of the upright layer or of the tanks, respectively. With small liquid capacities of one or several quarts, the layer of the streaming water may be as thin as an eighth of an inch or thinner. With larger tank capacities it may be as thick as ½ inch or more. The effectiveness of the temperature control increases as the linear travel speed of the streaming layer of temperature conditioning water over the major vertical faces or major vertical sides of the tanks increases. Decreasing the thickness of the layer of streaming water, with a given constant width, increases the travel speed at a given flow rate of the water. On the other hand, the flow rate must be, for a given size and capacity of the equipment, high enough to provide enough heat capacity for the maintenance of the temperature in the treating solutions and to make up for the heat losses or gains from the surrounding atmosphere. The most advantageous flow rate and thickness of the layer of the streaming water depends also on other factors, such as the temperature differential between the treating temperature and the surrounding atmosphere and the heat conductivity of the equipment. Under average conditions, a flow rate of the circulating or continuous stream of water per minute of ¼ to 2 times the liquid capacity of the tanks or vessels gives usually very satisfactory temperature control, though the flow rate may also be lower or higher than this range. Flow rates per minute which are of the order of the liquid capacity of each of the tanks and thicknesses of the layer of streaming water between ¼ and ¾ inch are preferred with the larger size equipment comparable with that presently in commercial use. With the small size amateur equipment the layer of streaming water is preferably in a range between $\frac{1}{16}$ and ¼ inch.

The layer of temperature conditioning water flows in a vertical zig-zag pattern. This means it flows successively approximately vertically downwards, changes its direction through the horizontal to an approximately vertically upwards direction, then changes back to an approximately vertical downwards direction and so forth as it passes by the successive layers of treating solutions. This term includes also the predominantly horizontal flow direction, which the flowing layer of temperature conditioning water follows when it flows under the bottom of each of the layers or tanks, respectively. It will be appreciated that the length of the horizontal flow depends on the size of the equipment. Also in its horizontal flow the water exerts its temperature controlling effect. Similarly, part of the flowing layer of the temperature conditioning water may also flow over at least part of the end walls of the tank or layer of treating solution. All this contributes to a better and more efficient heat exchange and thus to a better, faster and more accurate maintenance of the desired treating temperature in the treating solutions.

In exceptional, very unfavorable cases, e.g. where the treating temperature is much higher or lower than the surrounding atmosphere it may be of advantage to purposely set the temperature of the streaming temperature conditioning medium appreciably higher or lower than the desired treating temperature. Deviations of ¼ to ½° F. are generally sufficient to meet any situation encountered in the practical development of color materials. This expedient provides sufficient heat exchange capacity without requiring an unnecessarily increased flow rate of the temperature conditioning water.

If the temperature conditioning medium is circulated it is desirable to continuously adjust and readjust the temperature of the circulating water to the desired temperature. This can be readily achieved by placing a thermostat-controlled electric heating element into the path of the circulating water, so that the water passes continuously over the heating element which is shut on and off as needed by the thermostat. This may be accomplished while the water passes through the return line or it may be achieved in the water jacket while the water is still spread out to the thin layer, e.g. by the use of a thin plate-like heating element which is circumflown by the water stream at the upstream or downstream end of the water jacket. The placing of the thermostat in relation to the heating element is done in accordance with general experience so that the temperature fluctuations between on and off cycles are not too large. The reformation of the streaming water to a thin layer has an equalizing effect, especially if this is achieved by the use of a distributor pipe or similar means as will be explained hereinafter. The heater may also be placed in a heating chamber which is provided inside or outside of the water jacket.

If the surrounding atmosphere is warmer than the desired treating temperature the temperature conditioning water will be warmer than desired when it is continuously recirculated. The excess heat energy can be removed by the use of thermostatically controlled cooling equipment instead of the above described heating unit. If desired, one may also use a combination of both devices, i.e. the circulated temperature conditioning water is run over a spiral or the like containing flowing cold water or other coolant which provides a heat exchange capacity which is high enough to cool the temperature conditioning water to a temperature somewhat below that desired. Thereafter the water is flown over the thermostat-controlled heater to be brought back to the exact desired temperature.

The process and methods of the present invention may be carried out in a variety of equipment such as in a battery of jacketed tanks which are connected to each other by tubing to result in the desired flow pattern of the present invention. It was found that best results can be achieved in my new processor which comprises a compartmented water jacket and removably inserted in compartments of the water jacket in sealing relationship a series of chemical tanks. The water jacket is an elongated, rectangular vessel into which are joined transversal separatory walls at a spacing so that a series of water tight compartments is formed in the water jacket, each compartment accommodating one tank leaving between the separatory walls and the major vertical side walls of the tank, when they are inserted, a space of a thickness which corresponds to the desired thickness of the streaming layer of temperature conditioning water as set out hereinbefore. The separatory walls extend to a height appreciably below the upper edges of the water jacket, so that the upper edges of the separatory walls can be conveniently overflown by the streaming layer of water. The walls of the compartment which are in common with the walls of the water jacket are called end walls. Similarly, the end walls of the tanks are those opposite the end walls of the compartments when the tanks are inserted in the compartments in operating position. They are usually the shorter walls as has been explained above. The chemical tanks must be inserted in the compartments in sealing relationship or with tight fit. This term is intended to mean that there is a seal between the end walls of the tank and of the compartment. Seal may be achieved by close fit between the outside of the end walls of the tanks and the inside of the end walls of the compartments wherein they are inserted. Good seal may, however be achieved more conveniently by the use of gaskets, seal strips with or without counter sealing means such as vertical channel-like members. U-channels etc. In this respect reference is made to the teaching contained in my copending application Ser. No. 350,612. The gaskets may have any desired form such as flat, wide ribbons extending over the whole width of the end walls of the tanks or compartments or they may be profiled seal strips cooperating with suitably shaped counter sealing means such as channels or indentures or directly with the end walls. The gaskets or other sealing means may be made from soft rubber or from foamed materials such as foamed rubber or foamed plastics preferably with a smooth outer skin. They may be used as an independent unit or they may be contained on the end walls of the tanks or vessels or on the end walls of the compartments as may be desired. Ease of insertion of the tanks or vessels into the compartments and convenience coupled with the attainment of tight seal make it desirable to use a water jacket or bath in which the end walls of the compartments are slightly slanted because of a trapezoidal cross section of the water jacket or bath as is shown, for instance, in FIG. 3 of my copending application Ser. No. 350,612. The trapezoidal water jacket may be used with advantage with tanks having at their end walls sealing means with a similar slant or with tanks in which the end walls have a similar slant. Such tanks are illustrated, for instance, in FIG. 5 of the drawings of my copending application Ser. No. 350,612.

If it is desired to use the standard form, rectangular cross section water jacket, and the standard chemical tanks, it is of advantage to use special sealing means which permit the convenient and trouble free insertion and removal of the tanks in the compartments and which give instantly tight seal when it is desired. An example of such sealing means are the inflateable, tube-like sealing means which will be described hereinafter. The adjustable seals have the advantage that the conventional type of water jacket, with the separatory walls added, may be used and the tanks may be suspended therein in conventional manner, whereby the seal is established after insertion of the tanks in the compartments. This type of seal therefore permits readily the conversion of existing equipment.

The term "tight seal" or the like does not necessarily mean that there is an absolute seal. For practical purposes it is sufficient, if there is enough resistance to the flow of the water at the end walls so that the major portion of the water follows the new flow pattern of the invention, viz. the vertical zig-zag path. A little seepage is not necessarily of detriment, even though it tends to reduce somewhat the efficiency of the equipment.

Figure 2:
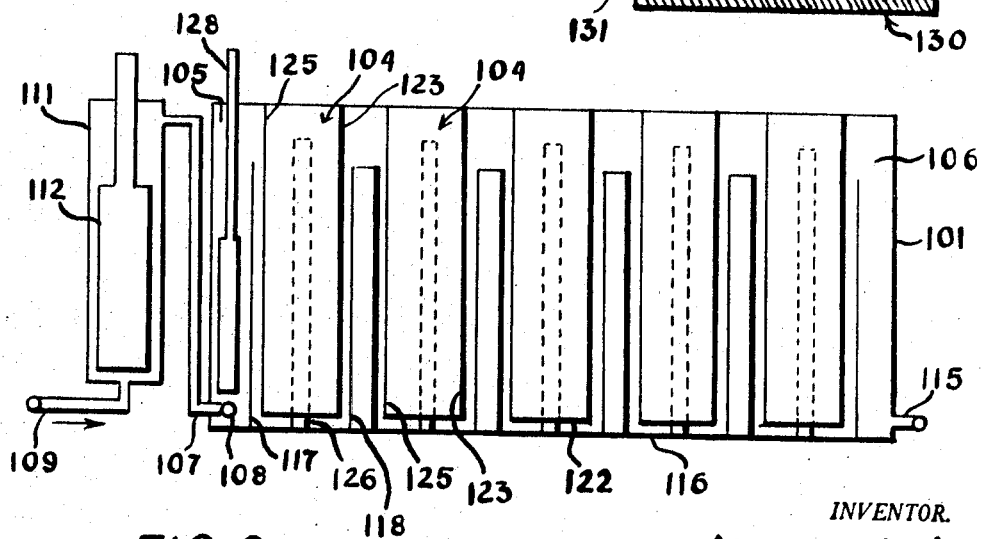

An apparatus in accordance with the invention permitting excellent temperature control in the chemical tanks is illustrated in FIGS. 1 and 2 of the attached drawings. Water jacket 101 is subdivided by separatory walls into water tight compartments each having a bottom 116, side walls formed by separatory walls 117 or 118 respectively, and end walls 129. These are the working compartments, into which are inserted in sealing relationship tanks 104, each tank having a bottom 122, major side walls 123 and 125 and end walls 124. Between the vertical endwalls 124 of the tanks and the opposite end walls 129 of the compartments are inserted gaskets 126 extending over the entire height of the end walls 124 of the tanks and establishing essentially liquid tight seal between the end walls 124 of the tanks and the end walls 129 of the compartments. Gaskets 126 may be simply inserted between the tank and compartment walls or they may be joined to either the end walls of the tanks or of the compartments.

At each end of the compartmented water jacket 101 is an adjuvant compartment 105 and 106, respectively. At the bottom of adjuvant compartment 105 at the left is a water inlet 107 leading into a water distributor 108 with a row of perforations at its upper side. Adjuvant compartment 106 is connected to a water outlet 115 and pipe 109, which is connected over circulatory pump 110 to heating chamber 111, which contains an electric submersion heater 112. Heating chamber 111 is connected by piping to inlet 107, all parts being connected such that the water leaving outlet 115 is transported by pump 110 through circulating pipe 109 and through heating chamber 111, from where it flows through inlet 107 and water distributor 108 into the upstream adjuvant compartment 105 wherein it flows upwardly, overflowing the first separatory wall 117, flowing thereafter downwardly, in an extremely thin, wide-spread layer in the space between the first separatory wall 117 and the upstream major side wall 125 of the tank 104 contained in the number one working compartment. Thereafter the streaming water underflows tank 104, passing under its bottom in an essentially horizontal flow direction and thereafter it flows upwardly in the narrow space between the downstream wall 123 of tank 104 and the major side wall 117 (separatory wall) of the first working compartment. After overflowing the first separatory wall 118 of the first working compartment, it reverses its flow direction, flowing downwardly in the narrow space between the major side wall 125 of the second tank 104 contained in the second working compartment, underflowing the tank, flowing upwardly alongside the downstream major sidewall 123 of the second tank 104 and so forth until it overflows the last separatory wall to flow downwardly in the downstream adjuvant compartment 106 which it leaves through outlet 115. From there it is recirculated in pipe 109 by the water pump 110 through inlet 107 and distributor 108, passing thereby over thermostat 128. On its long, vertical zig-zag path through the water jacket and by the tanks the water has transferred some of its energy to the tanks and the chemical solutions contained therein and has achieved a lower temperature. Heating element 112, controlled by thermostat 128 reheats the water to approximately the temperature desired in the chemical solutions in the tanks. The flow rate of the circulating water stream is preferably adjusted such that there is only a minimal temperature drop of e.g. less than 0.2° F Though, with most color developing processes, the temperature in the chemical solutions following the first and sometimes the second bath may vary by as much as 2° F. from the desired mean value without detriment to the accuracy of the results. In these cases a deviation of the circulated water in its last downstream location and before its reheating, of up to 2° F. is acceptable.

The temperature control system, employed in the apptratus of the present invention is extremely efficient and effective. By forming the streaming temperature conditioning water into a thin wide-spread layer one creates the maximum of contact area between the streaming water and at the same time a relatively high velocity of the streaming water with which it passes over the walls of the tanks or vessels. In this manner the heat capacity of the flowing water is utilized in the most efficient manner and the heat exchange is, for a given flow rate of the streaming temperature conditioning water, the most efficient which can in practice be achieved. Since one uses advantageously temperature conditioning water of approximately the temperature desired in the tanks, there is no danger of overheating and no special control means are required. On the other hand, the great efficiency and effectiveness of the new system provide, that at all times at least as much heat energy is available as is needed to replenish at all times the heat energy lost in the tanks by radiation and by other reasons. In this manner the system provides absolutely constant temperatures in the chemical solutions in the ranges prescribed by the manufacturers of the photographic color materials at a minimum of water flow and with a minimum of control means.

If cooling is desired, a cold water coil or a refrigeration unit can be simply included in the circulatory piping and controlled by the thermostat. As stated, it is however preferred to use both cooling and heating means in this instance, if the temperature of the surrounding atmosphere is at a level considerably above the desired treating temperature.

In FIGS. 1 and 2, the sealing means between the end walls of the compartments and of the inserted tanks have been shown to be simple flat gaskets. To facilitate insertion and removal of the tanks from the compartments, the end walls of the compartments and of the tanks may be slanted wih the wider opening at the top as has been described in detail in my copending application Ser. No. 342,029. If this is not desired one may use self sealing gaskets, e.g. of the excentric kind, which for insertion and removal of the tank are rotated a quarter turn for loosening the seal and which, with tanks inserted, are rotated a quarter turn in the opposite direction to produce tight seal between the tanks and the compartments as has been described hereinbefore. Any other kind of self-sealing gasket may be used.

It has been found, that ready, easy insertion and removal of the tanks and the achievement of excellent seal can be readily achieved if one uses the pneumatic seals of the present invention. These seals comprise hollow tubes of a soft material which are preferably mounted on the end walls of the compartments and which are closed at the low end and open at the top end. The hollow tubes, which are soft and collapsible, are advantageously all connected with their open upper ends to a common supply of a compressed fluid, e.g. a compressed gas like air, nitrogen, carbon dioxide, etc. or of a liquid under pressure. By opening a valve or other closure, means, after insertion of the tanks in the compartments, the collapsed tubes inflate and expand and produce an excellent seal between the end walls of the compartments and of the tanks. The use of piping and one single supply line of compressed fluid with the use of a single closure means makes it possible to establish instantly tight seal of all tanks in an apparatus by a turn of a single valve. The hollow seal tubes may have any desired cross section. They are advantageously flat on one side, so that they can be readily mounted on the end walls of the compartments. The remaining cross section is preferably oval or of similar excentric shape, so that it collapses when not under internal pressure and expands and rounds out when the compressed fluid is injected.

Figure 3:
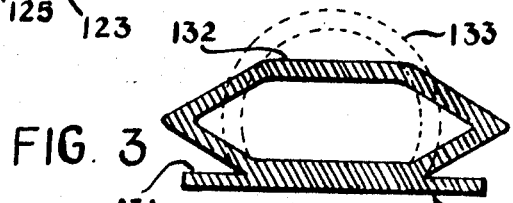
FIG. 3 is a cross section of a pneumatic seal tube useful with the apparatus of the invention.

An example of a suitable cross section for the pneumatic seal is illustrated in FIG. 3. Base 130 is flat and can be readily mounted e.g. by the use of adhesives on the end walls of the compartment. Angle members may be used to hold free ends 131 of the base. Cavity 132 is formed by the approximately oval, folded body of the seal. Inflation of the tube-like cavity 132 will tend to round out the cross section as shown in dotted lines 133.

As an example of the use of the new apparatus of the invention one employs a processor as shown in FIGS. 1 and 2 and equipped with 50 gallon film tanks. Seal is established by the use of the inflatable seal just described. Into the tanks are filled the treating solutions made up from the chemicals sold by the Kodak Co. for the C-22 process in this order from left to right: developer, stop bath, hardener, bleach and fixer. The solutions are brought to a temperature slightly lower than 75° F. The pump is then started and the thermostat-controlled heating element is made operative and the temperature conditioning water is circulated until the developer solution has a temperature within ½° F. of 75° F. and until the remaining solutions have a temperature in the range from 73–77° F. At this point a rack with 120 size Kodacolor film suspended thereon in full length is inserted into the developer and left therein with agitation for 14 minutes. The films are then transferred to the stop bath and successively into the other tanks in the chronological order from left to right in accordance with the time and treating schedule of the C-22 process by Kodak, with the intermediary and final washing steps being carried out in a separate conventional washing tank which is fed with running wash water having a temperature in the range from 73 to 77° F. When the films have been passed through all the steps including the final washing step they are hung up for drying.

The above mentioned vertical zig-zag flow pattern of a thin layered wide spread stream of temperature conditioning water for achieving the very efficient temperature control in photographic developing equipment may also be achieved by other means than the compartmented water jacket described hereinbefore. There are various other means and design of apparatus which permit to achieve the same or a similar flow pattern. In accordance with one embodiment of the present invention one employs double walled and double bottomed tanks of a special design as will be explained hereinafter. The new jacketed tanks of this design are set up as a battery or row of tanks with the inlets and outlets connected by piping or tubing as will be exemplified hereinafter.

An example of a suitable double walled and double bottomed tank is illustrated in FIGS. 4 and 5 of the accompanying drawings. Rectangular tank 160 comprises bottom 161, side walls 162 and end walls 163. Tank 160 is surrounded by an outer tank 164 of like shape which comprises bottom 166, side walls 167 and end walls 168 and which is somewhat larger than the inner tank, to form a jacket, leaving a space all around between the walls and bottoms of the two tanks when they are joined. Between inner end walls 163 and outer end walls 168 are provided vertical seal strips 169, which are joined to both the vicinary inner and outer end walls over the whole height of the tank to provide a vertical seal between the inner and outer tank. Outer tank 164 has in the center, top portion of side walls 167 water inlet 170 and outlet 171. When a stream of water is passed through inlet 170 it flows downwardly in the narrow space between side walls 162 and 167, underflows the tank and flows upwardly on the opposite side of the narrow space, leaving the tank through water outlet 171.

When two or more jacketed tank assemblies of the kind just described are connected by tubing or piping to a series in such manner that the outlet of the first tank is connected to the inlet of the second and so forth, one single stream of water can be passed through the battery of jacketed tanks. In this manner a continuous stream of water may be continuously passed through the jackets of the tanks and by the major side walls and bottoms of the inner tanks, or by connecting the outlet of the last tank in the series of tubing or piping with the inlet of the first tank and by placing a circulatory pump and a thermostat and a submersion heater into the line as described hereinbefore, the temperature conditioning water may be circulated with continuous reheating to the desired temperature as described hereinbefore with respect to the compartmented water jacket.

The outer tank is advantageously closed at the top and its upper edge joined to the inner tank. For achieving better stability, transversal supports 172 are preferably joined between the outer and inner bottom. In this manner the principle of the jacketed tank may be utilized also in very large size equipment. For better distribution of the incoming stream of water, a distributor, e.g., in the form of a perforated member 174 may be joined between the inner and outer major side walls of the tanks in a plane below inlet 170 and extending all around the inlet side, i.e., between vertical seal strips 169. Any other type of distributor may be used, which assures the formation of a wide stream of water. A similar arrangement may be provided on the outlet side to avoid pockets of standing water. Instead of surrounding the tank by the jacket, double walls may be simply provided along the bottom and side walls of the tank. This design is, as will be appreciated, less efficient in temperature control because it does not include the end walls. It is well suited to achieve excellent temperature control, if the tank is inserted in a regular water jacket or if the end walls are insulated.

In my copending application Ser. No. 52,524 and Ser.

No. 350,612 has been described a process and apparatus which permits to utilize one and the same stream of water for maintaining a desired treating temperature in the treating vessels or tanks and for washing the photographic material in at least one washing step and preferably in several washing steps. If there is used the concurrent method, i.e., forwarding of the photographic material in the same direction as the streaming water flows, clean, pure wash water will be available in each washing step as long as there is an intermediary treating step in a chemical solution which lasts as long or longer than the time which is needed to carry the washed out impurities from through the next washing location. This time is, in a properly designed apparatus of the kind described and illustrated in said copending applications, relatively short and takes from 2 to 3 minutes with a reasonable flow rate per minute of the water which equals or is little higher than the volume of the washing location.

Some newer photographic color processes have considerably shorter times of treatment in the intermediary treating steps between washings which may be as short as one minute. In these processes it was found to be more advantageous to run the photographic material countercurrently to the direction of flow of the streaming water. In this manner there is guaranteed fresh water in each washing location regardless of the length of the intermediary chemical treating steps and regardless of the number of washing steps in a treating sequence. In this embodyment of the apparatus and process it is only necessary to let the water run, after the completion of the last washing step, for a sufficient length of time to permit the displacement of all impure water in the water jacket or compartmented bath by fresh, pure water. This may take, depending on the design and size of the equipment and on the flow rate of the water from 5 to 8 minutes or more.

If it is not desired to observe such long waiting periods, the impure washing water may be simply removed at each washing location as the washing proceeds therein. There are many ways of achieving this and the apparatus may be designed in various ways to achieve this result. Theoretically the impure washing water could be removed through a closeable opening in the bottom of the washing location or compartment. This method, however, has the disadvantage that it is difficult in this manner to maintain the desired vertical flow pattern in the washing compartment. A better way of draining the water from each washing compartment is the use in the construction of the apparatus of a new kind of separatory wall which comprises at the top edge a channel-like trough member, which extends all the way across the bath when the separatory wall is transversally inserted in the bath or water jacket. The wash water overflows from the washing compartment into the trough which comprises a closeable opening permitting the operator to drain the water from the trough at any time he desires. Advantageously, said outlet for the water in the trough means is opened just before the washing in this particular compartment is begun. In this manner, none of the washed out impurities are carried into the downstream parts of the bath or water jacket. After completion of the washing step and preferably after a short waiting period of a minute or so, permitting the displacement of the contaminated water in the washing compartment by the incoming fresh water, the operator may close the outlet in the trough member, whereupon the streaming water passes over the separatory wall and through the apparatus in the usual manner. The same procedure is repeated at the beginning of the next washing step etc. If this method of draining the contaminated water is combined with the countercurrent flow method, there is always fresh water in all washing compartments at any time the material is ready for the washing and the temperature conditioning function of the same stream is not appreciably disturbed.

A separatory wall comprising a double wall with a space inbetween and a channel-like trough at the top for drainage in accordance with the principles set out hereinbefore is illustrated in FIGS. 6 and 7 of the accompanying drawings. Separatory wall 180 comprises a double walled main body 181 and superimposed at the top U-channel member 182 comprising a bottom portion 183, a lower transversal wall 184 and a higher transversal wall 185. To the right is indicated in dotted lines drain 186 with closeable closure means (not shown) such as a valve or any other suitable means. Drain 186 is normally traversing the side wall of the water jacket or bath in the indicated position, when the new separatory wall is inserted in the water jacket or bath and joined to the side walls and bottom thereof in water tight fashion.

Instead of having drain 186 to the side there may be simply one or more closeable openings in the center of the bottom portion 183 of the trough member 182 or in other convenient places in the said bottom portion. The opening may be a round hole which is closed by a removeable plug such as a rubber plug. This embodiment of the channelled separatory wall is particularly useful with the double walled variety. The lower or shorter transversal wall 184 which is placed toward the upstream side in the compartmented water jacket may also be omitted altogether. The modified transversal separatory walls are mounted in the bath or water jacket in lieu of the regular separatory walls shown in the compartmented bath of my said copending applications. The new separatory wall may be used with particular advantage in fully automatic equipment comprising automatic forwarding means and an automatic process timer controlling the operation. In this case the said closure means for the drains are automatic valves which are controlled by the process timer which is programmed to the process and which controls not only the operation of the automatic forwarding means but also the agitation and the opening and closing of said drainage valves at the various washing locations as needed.

The present invention comprises additional improvements which may be incorporated with great advantage in the design of the developing and treating apparatus using the vertical zig-zag flow pattern of the temperature conditioning water. The brackrest carrier for the photographic sheet materials and especially for the limp paper backed materials disclosed and claimed in my copending application 342,028 is advantageously provided with wires, such as thin plastic wires, which criss cross over both faces of the carrier and over and around the channel members, if desired, so as to form on each side a pocket-like compartment in which the paper is held by the wires. Instead of channel-like members for the support of the lower edge and sides of the paper sheet standing in the carrier, one may simply use bar-like supporting members which slightly project from the backrest, if one uses the expedient of the said criss crossing of wires on the faces of the carrier. The sheets find in this manner sufficient support and there is no problem of draining the channel member. An example of a carrier of this construction is depicted in FIGS. 8 and 9 of the accompanying drawings. Carrier 190 comprises backrest 191, supporting bar-like protrusions 192 around the vertical and bottom edges of backrest 191 on both sides of the carrier and agitating bar 193, joined over members 194 to the backrest. Around the supporting bars 192 are wrapped plastic wires 195. To both vertical ends of the backrest are joined guide means 196 of the kind described in my copending application Ser. No. 342,028. The sheets of photographic material are inserted into the pockets formed on each side of the carrier and between backrest 191 and wires 195 which are spaced by a slight distance from the backrest due to their being wrapped over and around supporting bars 192. The backrest may be simply a plate-life body or it may be perforated to permit better access of the wash water from the backside. In another embodiment of the carrier the backrest is a wire screen, such as plastic screening, set in a frame, which takes the function of the backrest.

The flexible photographic materials, especially the soft, paper backed materials attach themselves against the plane, solid backrest and are thus held in place during the treatment. However, when the carrier is rapidly agitated in the treating solutions, i.e. vertically reciprocated in the treating solutions with rapid, abrupt motion it may sometimes happen that the paper backed sheets gradually work their way upwards thus losing their hold in the bottom channels or grooves or supports. To avoid this, it is only necessary to provide, in accordance with the present invention a removable stop at the top edge of the backrest. This stop may be a channel member or a grove member or it may be simply a clamp, which members are designed to be removably slipped over the top edge of the backrest and to be held in place by elasticity. Any other meoans of providing such stop are also useful, e.g. the slideable stops disclosed and claimed in said application Ser. No. 342,028 in conjunction with other embodiments of the carrier and especially on the carrier on which the sheet is held in folded form. The stop may also be provided on the end of a pivoted arm etc.

The expedient of providing the funicular holding means, such as the criss cross wires over the faces of the carrier can be employed with great benefit also the backrest carriers which are adjustable to hold photographic sheet materials of varying sizes as well as with the carriers which hold larger than the standard size sheets in the folded state.

The present invention comprises also certain improvements in the design of the compartmented bath or water jacket and especially of the separatory walls. A common feature found in the apparatus of my copending application Ser. No. 350,612 is a trough-like compartmented bath or water jacket having side walls, end walls and a bottom and parrallel to the end walls transversel separatory walls joined to, or set removably in sealing relationship, to the bottom and to the side walls so as to provide individual, separate compartments of a height lower than the top edges of the bath or water jacket and removably set, in sealing relationship in the compartments thus formed, upright treating vessels having two major, vertical side walls, two end walls and a bottom so that a vertical space is left between the separatory walls of the bath or water jacket and the major side walls of the treating vessels or tanks and so that a passage is provided between the bottom of the treating vessels or tanks and the bottom of the bath or water jacket. In large equipment the tanks may also be permanently mounted in the compartments. Tight seal is established between the end walls of the vessels or tanks and the end walls of the individual compartments wherein they are contained.

Highest economy and efficiency of the apparatus make it desirable that the thickness of said vertical space between the separatory walls and the major side walls of the tanks or vessels is kept to a minimum. On the other hand, irregularities in the shape of the treating vessels or tanks, caused by a degree of flexibility e.g. in the case of those made from plastic and particular in the case of disposable vessels made from very thin plastics or from plastic coated paper or cardboard stock, place a limit on how narrow said vertical spaces can be made. If they are too narrow, e.g., less than one-eighth of an inch, there is the danger, that part of the major side walls of the treating vessels contact the corresponding parts of the separatory walls, thus impeding the uniform flow of the temperature conditioning medium around the major side walls of the treating vessels or tanks. This is of particular detriment also in the case of the washing compartments where partial contact of the walls of the washing vessel or separator with the separatory walls could possibly result in an uneven flow pattern and in non-uniform renewal of the washing water in the washing compartment.

The requirements for the flow rate of the temperature conditioning medium and/or washing medium are kept at a minimum without detriment to the accuracy of the temperature control in the treating vessels or tanks and to the washing efficiency in the washing locations by the provision of at least one and preferably a multiplicity of spacers or supporting members at a position between opposite faces of the separatory wall and the major side wall of the treating vessels and/or wash vessels contained in the compartments. The said spacers or supporting members may be simply dots or dot-like or other small protrusions arranged in any desired pattern, preferably in a vertical pattern. The most preferred spacers, in accordance with the invention, are vertical ribs. The ribs or other protrusions may be provided on the outside of each of the major side walls of the treating and/or wash vessels or tanks. In this case the ribs or other protrusions serve at the same time as reinforcing elements. It is however more preferred that the ribs or other protrusions are provided on the faces of the separatory walls and, if applicable, the inner faces of the end walls forming the individual compartments. This embodiment of the invention is particularly useful, if one wishes to employ the said disposable treating vessels. In this case the vertical side walls of the compartments with the spacers or protrusions thereon serve directly the function of the supporting vessel taught in my copending application Ser. No. 350,612.

Alternatively, the spacers may be provided as a separate unit, e.g. as an apron or the like with the spacers provided thereon. The apron may simply be placed between the separatory wall and the major side wall of the vessel. The apron may be of double length, so that it can be folded and placed over the separatory wall covering both sides of it. Where the spacers are vertical ribs, they may also be provided as a grid work or other separate unit which may be slipped between the separator wall and the major side wall of the vessel or which may be of double length and folded to be simply slipped over the separatory wall. Many variations and modifications may be made in this respect and all the modifications and embodiments of the spacers described hereinafter with respect to the permanently applied spacers apply likewise and may be employed in the design of the exchangeable spacers.

With the employment of the spacers the free space or volume between the separatory walls and the major side walls of the vessels or tanks is substantially reduced, on one hand because the spacers permit closer spacing of these walls and on the other hand because the spacers themselves take up some volume. This results in a smaller capacity of the treating apparatus for the temperature conditioning water and in a faster throughput of the streaming water with a substantially reduced residence time. This is very desirable.

The channels formed between the ribs may be made as small and narrow as is desired, the only limitation being the fact that heated water or mixtures of cold and warm water tend to form gas bubbles which may impede the flow of the temperature conditioning water if they settle in these channels. No problems in this respect are generally encountered, if the channels are at least about one-eighth of an inch wide and about one-eighth to one-quarter of an inch thick. Under favorable conditions the dimensions of the channels may also be smaller. The ribs separating the channels may have similar dimensions or they may be narrower or wider depending on the special circumstances such as construction materials, overall dimensions of the equipment etc. It need not be mentioned that with the larger size equipment the channels may have also larger dimension and a larger cross section.

The use of corrugated material in the major side walls of the treating vessels or tanks, the corrugations furnishing the spacers, has the advantage that the major side walls of the vessels or tanks may be made thinner without loss of mechanical stability, thus resulting in better heat transfer and better temperature control with a given material. This makes it possible to use also plastics as the construction material for the vessels even though their heat transfer properties are not the best. The reduction of the free cross section in the space between the separatory walls and the major side walls provides the great benefit and advantage that the wash water and/or tempearture conditioning water passes, at a given flow rate faster through the apparatus, thus carrying the washing impurities out of the apparatus faster and accordingly making the apparatus where the draining concept, described hereinbefore, is not used, even more efficient.

An example of a compartment comprising a vessel having ribs as vertical spacers is shown in FIG. 10 of the accompanying drawings. The compartment 210 comprises separatory or side walls 211, end walls 212 and a bottom into which compartment is set a treating vessel in sealing relationship with the end walls. The treating vessel comprises in its major side walls rectangular ribs 213 and between them vertical channels 214. Ribs 213 may be made of an elastic material with one rib each at the corners of the vessel serving as the sealing means. Elastic, soft or spongy ribs may with advantage also be employed in other embodiments of the spacers of the invention, particularly also in the ribbed compartment. The elastic or soft ribs are especially effective, if used in combination with a slightly tapered vessel in which the major side walls are slightly inclined to each other with a slightly wider cross section at the top end. The cross section of the separatory walls carrying the spacers may have any other desired form e.g., an undulating or corrugated cross section as shown in FIG. 11 or any deviation of these forms. Preferred is a triangular horizontal cross section of the vertical ribs as shown in FIG. 12. This embodiment of the ribs permits the ribs to touch the major side walls of the vessel without substantially reducing the effective heat exchange area. It is not necessary that the ribs or other protrusions are closely spaced. They may be widely spaced as shown e.g. in FIG. 13 so that only two or three or another small number e.g. up to 10 ribs are provided on each separatory wall of the compartment. The separatory wall may also be double walled, leaving a hollow space closed by a horizontal top section and with the spacers mounted on both vertical sides on the outside of the separatory wall. Another suitable design and cross section of the spacers is shown in FIG. 17.

The inventive concept of providing spacers between the walls of the compartment and the major side walls of the treating and/or washing vessels may with advantage also be employed with the cylindrical and the annular vessels taught in my copending application Ser. No. 342,459. The greatest benefits are achieved where the cylindrical vessels are used in upright position with their length axis vertical and in cylindrical compartments. The spacers and particularly the ribs may be provided on the walls of the compartment or on the major vertical cylindrical side walls of the treating and wash vessels in much the same manner as has been described hereinbefore with respect to the parallelepipedal vessels. The advantages are the same as mentioned hereinbefore. If desired, cylindrical aprons or grids carrying the spacers may be used and inserted in the space between the vessel and compartment as has been described hereinbefore.

Photographic processors having upright cylindrical tanks and compartments are taught in the said copending application Ser. No. 342,459. A fragment of an embodiment of the cylindrical tank processor, employing spacers, is illustrated in FIGS. 14 and 15. The processor comprises cylindrical tanks 230 which comprise circular bottom 231 and half cylindrical vertical side walls 232 which are joined to each other over counter sealing means 233 having the form of vertical grooves. The cylindrical side walls are joined in water tight fashion with their top edges into circular cut-outs in apron 235 which apron is provided at both sides with vertical rims 236. Groovelike counter sealing means 233 extend upwardly to the top edge of said rims 236. To the vertical cylindrical side walls 232 are joined all around vertical ribs 238, extending over the full height of the cylindrical compartment walls 232.

Into the cylindrical compartments 230 are set cylindrical treating tanks 240 comprising circular bottom 241 and half cylindrical major side walls 242. The major side walls are joined on opposite sides over vertical sealing means 244 which have the form of a thin vertical strip and which extend over the whole length of the treating tank 240 so that the tank can be removably inserted into the cylindrical compartment 230 with tight seal by slipping the sealing means 244 into the counter sealing means 233. The diameter of the cyindrical tank is slightly smaller than the circle outlined by the inner edges of spacers 238, so that the tanks can be easily inserted and removed, yet obtain support from the spacers where they touch them. This has the advantage that the tanks may be very thin walled and need not be rigid in themselves. The thin walled tanks provide better heat transfer and may be inexepnsively made from very thin plastics or plastic coated paper or cardboard stocks, so that they may be disposed after one or a few uses.

In the left cylindrical compartment is shown a washing vessel or separator of a new design which converts the compartment into a washing location. The new wash vessel comprises half of a cylindrical wall 250 with vertical sealing means 251 joined to the vertical edges of the half-cylindrical wall 250. The size and curvature of the cylindrical half wall of the washing vessel, which is in fact one half treating vessel, and the size and location of the sealing means 251 is identical to those of the treating vessel so that the wash vessel may be used exchangeably with the treating vessel or chemical tank in any compartment of the processor. To the bottom end of half wall 250 is joined horizontal bottom 252 which is provided with perforations 254 which bottom has a size similar to that of the treating vessel.

Both the washing vessel and the treating vessel are inserted and localized by the sealing means such that there is a narrow space left between the bottom of the vessels and the bottom of the compartments. The height of the half cylindrical walls of the vessels is such that their upper edge extends, the same as the sealing means, appreciably higher than the level of apron 235.

For the operation of the new processor a stream of water is flown onto the apron. When the water reaches the edge of a cylindrical compartment containing a cylindrical treating tank it flows into the narrow vertical space between the upstream half cylindrical wall of the compartment and the opposite half cylindrical wall of the tank, spreading out in a half cylindrical layer defined and limited by the vertical sealing means, flowing vertically downward in the said defined space. When it reaches the bottom, the water underflows, in a horizontal direction, the tank and flows then upwardly in the narrow space defined by the spacers and the downsteram half cylindrical walls of the compartment and of the treating tank. When it reaches the apron the water overflows onto the apron from where its path flowing into the next compartment as described before and so forth until the streaming water has passed through the processor from where it is disposed in the sink. By the use of a stream of temperature conditioning water having about the desired treating temperature it is possible in this manner to maintain in the cylindrical tank excellent temperature constancy.

If a compartment contains a washing vessel of the kind described hereinbefore, the path of the water differs depending on the orientation of the wash vessel in the compartment. If the half cylindrical wall is on the upstream side of the compartment, the water flows downwardly in the narrow space defined by the spacers and the half cylindrical walls of the washing vessel and of the compartment, flowing in part essentially horizontally when it reaches the bottom end of the wash vessel and reverse its flow direction upwardly by flowing through the perforations 254. It flows then upwardly over the whole circular cross section of the compartment or vessel and finally overflows onto the apron where it flows on the next compartment downstream. If the orientation of the washing vessel is reversed, the water flows first downwardly in said cylindrical space, passes at the bottom through said perforations and then reverses its flow direction, to return on its path vertically upwardly in the said narrow space between the half cylindrical walls.

The processor having the cylindrical tanks is primarily suited to be used for the development of roll films and movie film which are wound in form of a spiral or coil on a suitable carrier such as the customary reels. The new processor is particularly useful for the development of color films such as Kodacolor, Kodachrome and Ansco color films of all sizes and description in the chemical treating solutions made up from the chemicals sold in kit form by the manufacturers of the films such as the chemicals sold for the C–22 or E–3 process by the Eastman Kodak Co.

The new processor has advantageously as many compartments as there are steps in the process to be carried out. The washing vessels and the treating vessels or tanks are advantageously set into the compartments in an order which corresponds to the chronological order of the chemical treating steps and the washing or rinsing steps so that the photographic material may be forwarded from step to step, after the proper residence time in each compartment or vessel by inserting it into the next or neighbouring vessel or compartment, respectively.

The washing vessel may be modified in many ways. Different forms and sizes of perforations may be used in the bottom. The sealing means and counter sealing means may have any desired form or shape and may be made of any desired material as long as they satisfy the requirement of establishing good seal between the side walls of the compartment and the vessel, over the entire length and to a level somewhat above the apron.

The tanks or treating vessels and the washing vessels need not be exactly cylindrical. For convenience, they may be slightly conical with the top somewhat wider than the bottom. Likewise, the sealing means may be slightly trapezoidal the same as the counter sealing means such that both are slightly slanted at the edges which contact upon insertion of the vessels so as to be self-sealing. Many other variations may be made from the specific embodiment of the cylindrical processor shown in the drawings without detracting from the principles of the invention. The spacers may be omitted altogether, if rigid tanks or treating vessels and washing vessels are used or if the space between the walls of the tanks or vessels and of the compartment is more than about ¼ inch. The spacers may also be contained on the outside of the walls of the treating and washing vessels or tanks.

The present invention concerns also a new type of wash vessel which is distinguished from the wash vessels described and claimed in my copending application Ser. No. 342,030 by the fact that it has only one plane major side wall while the second major side wall is replaced by one of the separatory walls of the compartment when the washing vessel is inserted therein. In practice the new washing vessel is one-half of a treating vessel with the vertical sealing means intact and the bottom omitted. When the washing vessel is inserted in a compartment by its sealing means in engagement with the counter sealing means of the compartment, a washing location is established, which is slightly larger in volume than the corresponding treating vessel and through which the stream of washing medium passes in generally vertical direction in much the same way as has been taught with respect to the washing vessels in the aforementioned application. The novel washing vessel which may also be called a washing separator, has advantageously male sealing means which are set in female counter sealing means in the compartments of the compartmented bath wherein the washing separator is used. The general dimensions of the half vessel and of its sealing means correspond exactly to those of the treating vessels so that full exchangeability is assured and either a treating vessel or the washing separator may be inserted in any of the compartments of the compartmented bath or water jacket. If desired, the half vessel may be provided with spacers as disclosed hereinbefore, so as to match the dimensions and general appearance to the treating vessels with which it is to be used. It is important that the single major side wall of the vessel has a height, which gives its upper edge a level appreciably higher and preferably at least about one half inch higher than the neighbouring separatory walls of the compartment when the vessel or washing separator is inserted in the compartment. Only, if this precaution is observed, viz. setting the upper edge of the washing separator higher than the upper edge of the separatory walls of the compartment, will there be an efficient washing action. If the half vessel has the proper height, the streaming washing medium overflows the upstream separatory wall of the compartment, flows down in the space between this separatory wall and the major side wall of the washing separator, underflows this single side wall and flows upwardly in the space between the single major side wall and the downstream separatory wall of the compartment thus establishing the vertical zig-zag pattern which is characteristic of the apparatus of the present invention. The half vessel may be set either way, with its single major side wall toward the upstream or toward the down stream separatory wall, the only difference being the direction of flow of the wash water in the washing area proper i.e. upwards or downwards as the case may be.

An exchangeable washing separator or half vessel of this type is illustrated in FIG. 16 of the accompanying drawings. Separator 280 comprises a major side wall 281 of a width somewhat less than the width of the compartment in which it is to be used. Its height is sufficient to set the upper edge appreciably above the upper edge of the compartment side wall when it is inserted therein. To both vertical edges of side wall 281 are joined narrow end walls 282 at approximately a right angle. To the free vertical edges of end walls 282 are joined at approximately a right angle and pointing outwardly sealing means 283 of a kind, size and orientation and location corresponding to those in the treating vessel to be used with the separator.

In inserted position, the separator extends nearly to the bottom of the compartment, leaving a narrow horizontal slot at the bottom for the passage of the wash water. At the top an essential portion of the separator wall extends above the water line so as to establish effective seal within the compartment with only said slot at the bottom permitting the passage of the wash water through the compartment and assuring the desired vertical zig-zag pattern of flow of the washing medium.

The use of the washing separator is illustrated in FIG. 17 which represents a compartment of a compartmented bath in accordance with the present invention. The compartment comprises separatory walls 285 and 286 having spacers 290 joined thereto. The compartment 292 is trapezoidal and washing separator 293 is likewise tapered from top to bottom (not shown). Washing separator 293 is provided with vertical seals 294 which engage in the female counter seal having the form of grooves in the end walls of the compartment. Water flowing through the bath enters the compartment over separatory wall 285 and flows from there down in the space between the separator and the separatory wall 285, passes underneath the separator and flows upwardly in the space between the separator and the downstream separatory wall 286 which it overflows to leave the compartment, overflowing into the next compartment etc.

For larger size equipment and for professional size equipment, it is of advantage to provide the separator of the invention at the bottom end with a horizontal bottom-like extension which is joined to the single major side wall and to the end walls. This extension may extend to about the position of the sealing means or all the way to double this width. It is preferably provided with a central, or with several transversal slots or other perforations which permit better distribution of the flowing water over the whole width of the actual washing area when the washing separator is inserted in the compartment. The washing vessel or washing separator may also be constructed without the sealing strips 283 when the end walls of the separator are to serve directly as the means for the establishment of seal with the end walls of the compartment.

The present invention comprises also a treating vessel which is specifically adapted for the treatment of movie film or of reels of roll film in vertical orientation in the apparatus of the present invention, and of my copending application Ser. No. 350,612. The vessels described in the latter application are designed to handle primarily plane photographic sheet materials and films in a stretched out plane state. The upright roll film and movie film treating vessel is constructed very similar to the upright treating vessels mentioned above and comprises two vertical major side walls, two end walls, a rounded bottom and vertical sealing means. The rounded bottom forms preferably a half circle following the contours of the lower half of the reel of film to be treated therein. This design of the vessel has the advantage that much less treating fluid is required than in the rectangular treating vessel. Optionally the new film treating vessel may have a trough-like reservoir at the top of the kind described in the parent application. It may also be provided with spacers. The lower portion of the sealing means forms a full rectangle or trapezoid as the case may be. The portion of the sealing means located in the section underneath the rounded bottom may be widened to the full width of the vessel, in other words, the vessel may be a rectangular vessel with a rounded bottom inserted within the vessel.

Preferably, the upright film treating vessel has also a support at the center point which permits the insertion of the axle of the film treating reel. For agitation the roll of film may be simply rotated in the treating liquid around its axis. Alternatively, the film treating reel is on a special carrier which rests with its upper portion on the upper edges of the vessel and in which the reel films is supported by its axle or by its edges. In this case agitation is achieved simply by vertical reciprocation of the carrier with the reel suspended thereon. If desired, said carrier may have an agitation bar for use in fully automatic equipment.

An embodiment of the novel upright film treating vessel is illustrated in FIGS. 18 to 20 of the attached drawings. The treating vessel 340 comprises major side walls 341, a rounded bottom 342 and end walls 344. The rounded bottom forms a half circle. Sealings means 343 are joined to the end walls 344 and extend downward to the rounded bottom outlining a trapezoid.

Figure 21:
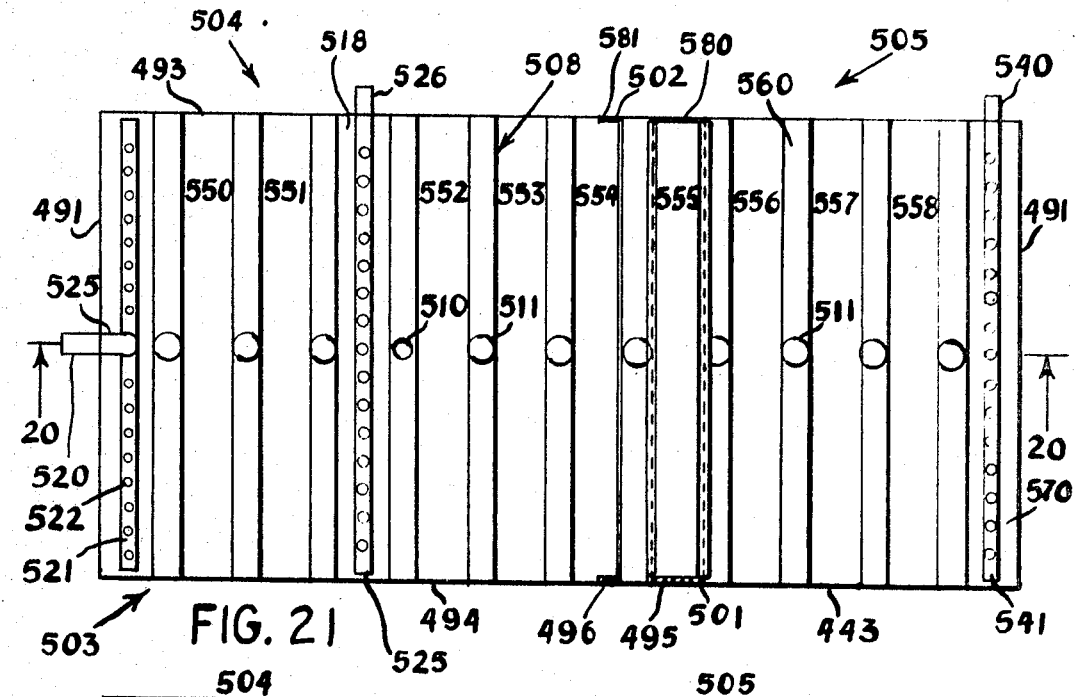
FIG. 21 is a top elevation and FIG. 22 a vertical length section of an improved developing and treating apparatus which comprises two separate sections A and B in which the water is flown concurrently in one section and countercurrently in the other section with the direction of forwarding of the photographic material.
Figure 22:
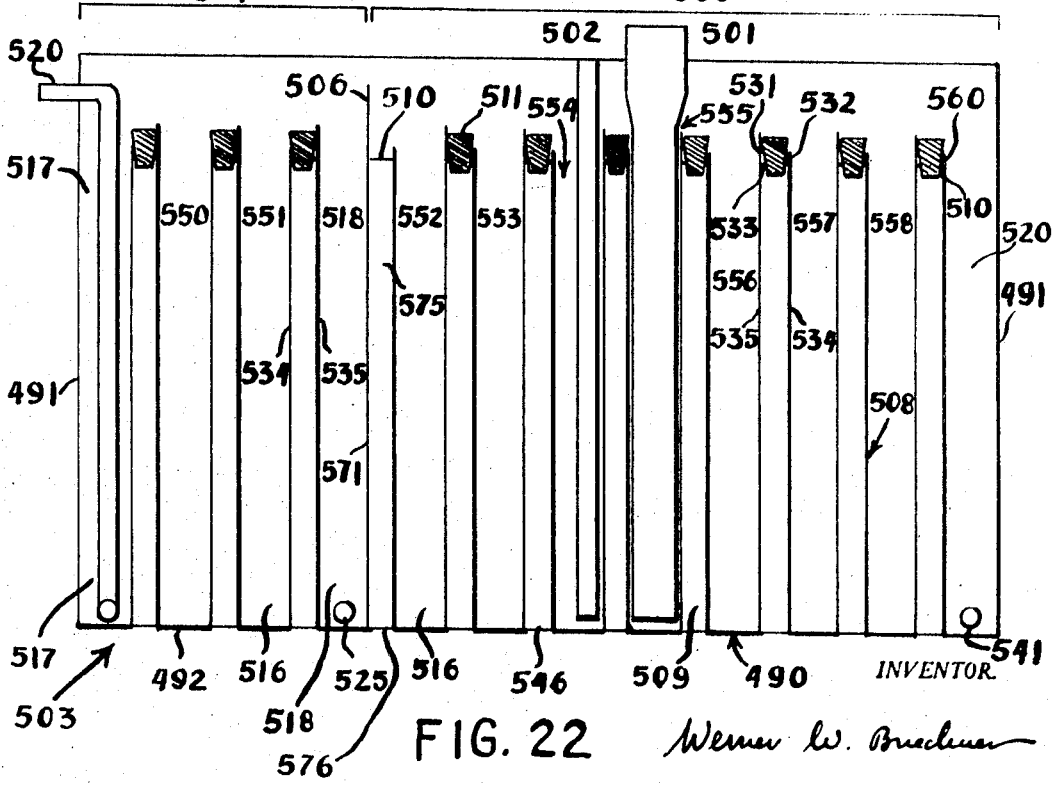

As stated hereinbefore, the new vertical zig-zag flow pattern of the temperature conditioning water may be employed with a concurrent or with a countercurrent flow of the water in relation to the direction of forwarding of the photographic material. The most accurate temperature in the first, second etc. treating vessels is achieved by the concurrent method. The countercurrent method provides absolutely fresh, pure washing water in each of the intermediary washing and rinsing steps. It was now found that the advantages of both methods may be realized, if the direction of flow of the water, which is for the first steps concurrent, is reversed, after the water has circumflown one or more treating vessels or tanks, to a countercurrent flow, for the remaining steps of the process. Normally, only the first developer and sometimes one or two additional steps require maintenance of the temperature within very narrow limits, viz. within plus/minus 0.5° F. of the prescribed treating temperature. All the other steps require lesser accuracy of the temperature, usually only within plus/minus 2° F. of the prescribed temperature. Accordingly, the new process comprises the flowing of the streaming temperature conditioning water first by the treating and rinsing vessels requiring the high temperature accuracy, in concurrent fashion, whereupon the streaming water is diverted to be flown countercurrently to the direction of forwarding of the photographic material by and around the vessels containing the treating solutions requiring the lesser temperature accuracy. All the washing and rinsing steps are preferably included in said second, countercurrent phase. The just described split flow direction method, which employs in both phases advantageously the vertical zig-zag flow pattern, may with advantage be combined with the step of draining the contaminated water from each washing location as it is formed. The process employing the combination of these steps, provides the highest possible temperature accuracy in each step requiring it and provides absolutely fresh, pure washing water in each interspersed washing and rinsing step. If desired, the temperature in the first phase, requiring high accuracy, may also be maintained by circulating water of the exact temperature in a closed, circulatory system, as described hereinbefore, while the second phase is run with a continuously running stream of water satisfying the temperature constancy requirements of the steps in said second phase. An apparatus permitting the operation of the new process is illustrated in FIGS. 21 and 22 of the attached drawings.

Any one or more of the various improvements described and taught in the foregoing may be incorporated in the design and construction of the basic developing and treating apparatus taught and claimed in the present application and described and claimed in my copending applications Ser. No. 52,524 and Ser. No. 350,612. Each of these features provides certain advantages and improvements as has been described hereinbefore. All but one of the treating vessels and washing separators, which can be removably set into the compartmented bath, have been omitted for more clarity of the representation. The apparatus is designed to handle any photographic color process having 9 steps or less and requiring very close temperature control e.g. within plus/minus ½° F. in the first or in the first two steps, and lesser accurate temperature control in the subsequent steps as is the case in most color developing processes recommended by the Eastman Kodak Co., such as Process P–111 for Kodacolor papers, and Processes C–22, E–2 and E–3 for Kodacolor and Ektacolor roll and sheet films as set out in detail in the Kodak Color Dataguide.

The improved development apparatus and photographic treating apparatus of the present invention comprises a compartmented bath or water jacket 503 comprising two distinct sections 504 and 505 (sections A and B). These two sections are separated by the high separatory wall 506. The complete apparatus, the compartmented bath 503 and removably inserted therein treating vessels 501 and preferably at least one washing vessel or half vessel 502 is set into a tray (not shown). The compartmented bath 503 comprises bottom 490, end walls 491 and side walls 493. The individual working compartments are formed by double walled, channelled transversal separatory walls 508 which are joined to the bottom 490 and to the side walls 493 of the bath in a direction parallel to the end walls 491 of the bath in water tight fashion. The separatory walls extend to a height appreciably below the upper edges of the side walls 493 and end walls 491 of the bath so that the streaming water overflowing the separatory walls is retained in the bath. The height differential between the upper edges of the side walls and end walls of the bath and the upper edge of the separatory walls required for proper operation of the equipment depends on the size of the apparatus, the intended flow rate and the internal resistance of the equipment to the flow of the temperature conditioning water. It is preferred that the said height differential is at least ½ inch and more advantageously 1 inch to two inches or more, though in exceptional situations a differential of less than ½ inch may also be acceptable.

In accordance with the foregoing, each working compartment is formed by parts of the bath and by the separatory walls, the separatory walls forming the side walls, a section of the side walls 493 of the bath forming the end walls 494 and a section of the bottom 490 of the bath forming the bottom 492 of each compartment. The space 509 formed between the double walls of the separatory walls 508 is open to the bottom through opening 546. The vertical side walls of the separatory walls 508, that is the outside of upstream wall 534 and downstream wall 535 are provided within the working compartments with vertical, triangular spacers of the kind illustrated in FIG. 12 of the attached drawings (not shown in FIGS. 21 and 22 for clarity of representation). The separatory walls defining the working compartments 550 to 558 are provided at their top end with trough-like channel members 560 of the kind described hereinbefore and illustrated in FIG. 7 of the drawings, with the downstream side wall 532 of the channel member, extending to a level higher than the upstream side wall 531. In the central bottom portion 533 of each trough-like channel member 560 is provided a circular opening 510 which is removably closed by a rubber plug 511 in all separatory walls with the exception of that being downstream of working compartment 552. The separatory walls in the left section 504 of the bath may also be modified so as to not comprise a trough-like channel at the top. Instead the horizontal top section of the separatory walls may be raised in this section to a level corresponding about to the level shown in the drawings. The left section of the bath comprises only two working compartments 550 and 551 flanked on each side by adjuvant compartments 517 and 518. At the left end wall 491 of the bath 503, leading into adjuvant compartment 517 is provided inlet 520 which is connected to and leads into distributor pipe 521 which extends over the whole width of the adjuvant compartment and which has at its top side perforations 522. In adjuvant compartment 518 is set at the bottom perforated pipe 525 which is connected to outlet 526. At the far right is adjuvant compartment 520 which comprises at the bottom perforated tube-like distributor 541 which is connected conductively to inlet 540. The two independent sections 504 and 505 of the bath 503 are separted by high transversal wall 571, which differs from separatory walls 508 by the fact that the higher wall section 506 of the superimposed trough 560 extends to a level appreciably higher, and preferably more than ½ inch higher than the high walls of the trough members in the remaining separatory walls 508. In this manner, separatory wall 571 serves as the divided, making the two sections 504 and 505 of the bath completely independent from each other as to the streaming temperature conditioning medium to be circulated through the bath and permitting the passage of the water or other temperature medium in opposite directions in these two sections. There are different ways in which the apparatus may be operated. The left section may be operated as a closed system in which the temperature conditioning medium is circulated by a pump over a thermostatically controlled electric heating element in the manner shown e.g. in FIGS. 1 and 2 of the attached drawings. The cycle is established by connecting inlet 520 over tubing (not shown) to outlet 526 and by the inclusion of a circulatory pump and a heating chamber in the manner shown in FIGS. 1 and 2 and as described hereinbefore. As will be appreciated the temperature conditioning medium or water may be passed through the left section 504 in either direction by reversing the function of the inlet and outlet means as may be needed.

Into the working compartments 550 and/or 551 are inserted treating vessels containing chemical treating solutions requiring exact temperature control as is the case for the first developer for Kodak's Processes C-22, E-2 and E-3 requiring the maintenance of the temperature within ½° F. of 75° F. The other compartment may be employed for carrying out the prewetting step where it is required, as e.g. in Process P-111 of Kodak or for other treating steps, requiring a treating vessel or a washing separator. Small fluctuations of the temperature conditioning water leaving the heating chamber and entering the adjuvant compartment in the left section are not detrimental because the water is spread out to a wide stream in the adjuvant compartment and considerable mixing and leveling out occurs while the water flows slowly upwards in the adjuvant compartment. Important is only that the temperature averages to the exact desired mean temperature within the specified ranges.

As will be appreciated, the circulated or passing temperature conditioning water or other medium, as it passes in a very wide-spread thin layer over the entire submerged wall area of the treating vessel is extremely effective in heat exchange. The effectiveness of this system is so great that one need not necessarily use a good conductor as the construction material for the treating vessels. Thin-walled plastics or plastic coated paper or cardboard stocks have still sufficient heat transfer properties to permit exact temperature control in the treating vessels of the apparatus of the present invention.

The right section 505 of the compartmented bath 503 comprises 7 working compartments and at the far end an adjuvant compartment. Each of the working compartments of the apparatus comprises advantageously at the end walls of the compartments vertical counter sealing means and the treating vessels and washing separators comprise suitable sealing means so as to facilitate the insertion of the treating and wash vessels with tight seal between their ends walls as described hereinbefore and in my copending application Ser. No. 350,612. The compartmented bath may contain any other desired number of working compartments in each of the sections as may be desired. All the washing steps are advantageously carried out in the right section 505 of the bath through which is passed a continuous stream of temperature conditioning water the temperature of which is maintained on an average within the range required for the treating steps and treating chemicals served by it. This water may be taken from a regular mixing valve, from a thermostatically controlled mixing valve or from a thermostatically or otherwise controlled water heater. Gaskets 580 and 581 establish tight seal at the end walls of the vessels. If a continuously running source of water is available, which supplies water of a temperature constant within a narrow range of the desired treating temperature e.g. within plus minus ½° F. in the case of Kodak's color processes, it is not necessary to operate the left section 504 separately with a circulatory system as described hereinbefore. Instead, the heating chamber and the circulatory pump may be omitted and outlet 526 is directly connected by tubing or piping to inlet 540 on the right leading the water into right section 505 after it has passed through left section 504. In this manner a single stream of water which enters the left section 504 at inlet 520 is first used to maintain an accurate temperature in the first treating step or steps in the left section 504, thereafter it is passed on to the inlet side of the right section 505 where it serves to maintain the temperature in the remaining treating solutions at the desired level and where it serves also as the washing medium in the various washing and rinsing steps as described before.

The flow rate of the water passing through either of the sections need not be high as has been explained hereinbefore. To shorten the start up time it is of advantage to use if possible preheated treating solutions which have a temperature slightly lower than the desired treating temperature or to use initially a stream of water having a higher temperature than the desired treating temperature until the treating solutions have assumed a temperature close to the desired treating temperature.

For carrying out a treatment the operator places the sheets or films of photographic material on a suitable carrier or rack or suspends them therefrom. For paper backed sheets, using small amateur size equipment one may use with advantage a carrier as described and illustrated hereinbefore. It is to be noted that the carrier is submerged in the washing locations somewhat deeper than in the treating vessels so that also the chemicals adhering to the upper neck portions of the carrier are removed by the washing in each step. Before the operator starts a washing operation in any of the washing locations he opens the closure means of the drain, i.e. he removes the stopper 511 from the downstream opening 510 in each case. He leaves the drain open for the duration of the washing step and preferably also for the time it takes to completely refill thereafter the washing location with fresh water. The operator need not close the stopper after the completion of the washing step, if he so desires, but continues the forwarding of the material countercurrently and successively carries out all washing steps as they occur in the process. When the process sequence is completed he lets the water run a little longer and before he starts the next batch of material, he closes all the plugs. While the material is treated in the first developer in the next treating sequence, the passing temperature conditioning water which is kept running, restores the proper temperature in all the treating solutions in the right section.

The following is an example of the operation of the process of the present invention. In the apparatus illustrated in FIGS. 21 and 22 which is set into a tray having a drain leading to the sink, is placed a treating vessel containing the first developer by setting it in sealing relationship into compartment 550 in the left section of the bath. Likewise into working compartment 551 is inserted a treating vessel containing the stop bath of the treating solutions prepared from the chemicals sold by the Eastman Kodak Co. as a kit for carrying out Process P-122. In the right section 505 are inserted in working compartments 552, 554, 556, 558 treating vessels containing in this order from left to right the first hardener fixer, the bleach, the Formalin fixer and the buffer. Working compartments 553, 555 and 557 are each provided with a washing separator of the kind described hereinbefore which is set therein in sealing relationship. A supply line of water providing a continuous supply of water having a temperature of 85 plus/minus ½° F. which is fed by a thermostatically controlled water mixing valve is connected by tubing to water inlet 520. Water outlet 526 is connected by tubing to water inlet 540 in the right section 505. As soon as the first developer has assumed a temperature in the range from 84.5 to 85.5° F. and the remaining treating solutions in the range from 83 to 87° F., the development of two exposed enlargements on 8 by 10 Kodacolor enlargement paper is begun by inserting the sheets, while they are held on a carrier, into the first developer for 7 minutes with agitation which consists in vertical reciprocation of the carrier in the developer solution. Thereafter the sheets while still on the carrier are removed from the developer solution, drained for 20 seconds and inserted into the stop bath for 1 minute. In the same manner the sheets are carried through the remaining steps of the process by insertion for the prescribed times in these solutions and in the intermediary washing steps. This is being done by systematically forwarding the sheets from one working compartment to the neighbouring etc. Before the sheets are inserted in a washing location the operator opens the drain 510 by removing the plug downstream of the washing location as described hereinbefore. After removing the sheets from the last bath, the buffer, the sheets are hung to dry.

As stated, the number of working compartments may be varied in either section of the bath as may be required for the process to be carried out having the largest number of steps. Reversal processes usually have a larger number steps and require therefore more working compartments. It is to be noted that it is not necessary that each compartment is occupied and used in the process, though it is of advantage to insert in the unused compartments empty vessels or washing separators in order to maintain the vertical zig-zag pattern of the invention also in these compartments. If one wishes to use one and the same processor for both short processes and long processes one may add another separate auxiliary unit having a sufficient number of working compartments. In this case one connects the stream of continuously flowing water to the water inlet of the auxiliary unit at the far end and its outlet to the inlet of the regular unit, so that both units may be served by a single stream of water. Otherwise the auxiliary unit is constructed in a manner as described and taught for the right section 505 of the compartmented bath.

Instead of setting the compartmented bath into a tray, the space between the double walls of the individual separatory walls may be closed off and piping or tubing may be connected thereto and to openings 510 and the drained wash water is collected in a common waste line to which they are connected. Alternatively outlets with closure means are directly provided at the channel member as shown in FIG. 6 where piping 186 leads directly from the channel through the sidewall of the bath. The outlets are connected over closure means to a common wasteline as described hereinbefore. This manner of construction is particularly desirable for large size, professional equipment.

The apparatus has been described hereinbefore for the use with small quantities of treating solutions by the amateur and professional. The principles underlying the design and construction of the apparatus may, however, also be utilized in corresponding manner for large size professional equipment having tanks of 1 gallon, 3½ gallons, or larger sizes up to 100 gallons or more. In this case one can also utilize one or more of the specific improvements shown hereinbefore or in my copending application Ser. No. 350,612. Instead of using closeable orifices one may use pipes and tubing and valves etc. as set out hereinbefore. The equipment may also be designed for fully automatic operation by the provision of suitable forwarding means for the photographic material which operate by the direction and control of an automatic program timer fully automatically. This timer can also be designed to control and effect the opening and closing of said drainage valves. If desired, the drainage feature may also be omitted, because the apparatus has due to its particular design and construction and due to the use of the countercurrent flow method a self-cleaning ability. In this case it is only necessary to observe that a new batch material is not run prior to the time that the wash water in all washing areas has been displaced by clean fresh water.

The apparatus for amateurs may be made from stainless steel or other metallic materials, or more conveniently and at less cost from plastics such as linear polyethylene, polypropylene or high impact polystyrene copolymers. For critical work the treating vessel containing the first developer may also be in this instance be made from stainless steel. The apparatus for professional use is conveniently made from stainless steel.

Instead of constructing the two section bath of the present invention as one unit, the sections 504 and 505 may also be designed as independent baths. However, for equipment using automatic forwarding means for fully automatic operation it is preferred that the whole apparatus is designed as a single unit.

The new apparatus of the invention has been shown for the operation with photographic sheet materials. It may also be used with equal benefit with film materials and especially with roll films which are treated while suspended on a suitable rack in their full length with the treating vessels being high enough to accommodate these films. Usually these vessels are large enough to accommodate a large number of films at once, up to 50 or even up to 100 films or more. The advantages of the present invention are realized in equipment of this size to even a higher degree than in the smaller size equipment. The treating vessels, the washing vessels or separators and the bath or water jacket have advantageously a trapezoidal cross section because of the self-sealing qualities of such equipment.

As has been shown hereinbefore, the new apparatus is unique in its design and its operation is simple, convenient and versatile permitting a streamlined operation of color developing processes with the greatest of ease and with an accuracy as it cannot be achieved with the equipment available at this time in the trade.

It is to be noted that the left section 504 in the illustrated apparatus may also be operated in countercurrent fashion, if the inlet and outlet means are reversed. If a source of circulating or running water, having a constant temperature in a narrow range of e.g. 0.5° F. is not available, the apparatus may also be operated by running a stream of water which is substantially warmer (colder) than the desired treating temperature. This stream is run, with stirring of the first developer solution through the left section 504, until the developer solution has assumed the correct treating temperature. The water is then shut off in the left section 504. The developer solution, contained in the water jacket, holds its temperature long enough to permit the completion of the developing step at the correct temperature range. The right section 505 is in this case fed with a stream of water having a temperature in the desired wider range of e.g. plus/minus 2° F., which may be obtained by simply mixing hot and cold water. As soon as the treating solutions contained in the right section have assumed the proper treating temperature the operator may begin the processing. The stream of water is of course passed through the right section 505 for the duration of the processing sequence. In this manner no expensive or complicated valves or heaters are required for the operation of the processor. All that is needed is a source of running hot and cold water.

The principle of the segmented bath and the countercurrent flow of the temperature conditioning water in the right section and if desired also the drainage feature for the wash water in each washing location, described hereinbefore may with advantage also be employed in the design and construction of the hereinbefore described processor comprising the cylindrical treating and washing vessels and the cylindrical compartments.

What is claimed is:

1. A water jacket for use in photographic wet processing equipment, which water jacket comprises a receptacle, having a bottom and at least one essentially vertical side wall, which receptacle is subdivided by separatory walls into a plurality of adjoining, essentially water-tight compartments and essentially horizontally disposed on separatory walls trough means comprising a bottom, essentially vertical side wall members having esssentially horizontal top edges, said trough means being open at the top, and comprising closeable drainage means for drainage of a liquid from said trough means and from said water jacket, said separatory walls and trough means extending to a height substantially lower than said side wall of said receptacle so as to permit the passage of a liquid medium over said separatory walls and over said top edge of said trough means from one compartment to the next.

2. The water jacket of claim 1, wherein the separatory walls are double-walled so as to provide a cavity between the walls, into which cavity lead the said closeable drainage means, and which cavity is provided with outlet means for the liquid.

3. The water jacket of claim 1, which comprises a horizontal divider on a separatory wall, separating the water jacket in two distinct sections, each section comprising at least one working compartment, and each section in combination with water inlet and water outlet means.

4. The water jacket of claim 1 in combination with water inlet means at at least one end and inserted in at least part of the compartments means adapted to provide washing locations of essentially vertically flowing wash water in said compartments.

5. The water jacket of claim 1, wherein the receptacle has an essentially rectangular shape, having a bottom, two end walls and two side walls, and wherein the separatory walls extend across the receptacle from side wall to side wall and being joined thereto and wherein the trough means comprise a channel-like structure extending substantially horizontally along the top edge of said separatory walls.

6. The water jacket of claim 5, wherein the said compartments are essentially parallelepiped comprising a bottom, end walls and side walls coextensive with said separatory walls and wherein the end walls of the compartments comprise countersealing means adapted to provide sealing relationship between the end walls of the compartments and a treating vessel or tank when it is inserted therein, so as to provide for a liquid passing through the compartment an essentially up and down path through the compartment and around the vessel or tank.

7. The water jacket of claim 6, wherein the end walls of the working compartments comprise essentially vertical groove-like countersealing means.

8. The water jacket of claim 1, in which at least part of the compartments contain treating tanks, for the reception of photographic chemical treating solutions, in sealing relationship between the essentially vertical end walls of the tank and of the compartments with an underflow passage beneath the tank, so as to provide for a liquid, passing through said receptacle a path which resembles a wide, sinusoidal essentially vertical pattern extending essentially over the whole width of the compartment.

9. The water jacket of claim 1, in which said closeable drainage means comprise closeable valves communicatively connected to said trough means and to outlet means comprised at the water jacket.

10. The water jacket of claim 1, in which said closeable drainage means comprise removable stoppers provided in a suitable outlet in said trough means communicatively connected to outlet means comprised in the water jacket.

References Cited

UNITED STATES PATENTS

| | | | |
|---|---|---|---|
| 846,109 | 3/1907 | Johnson | 95—98 |
| 1,891,917 | 12/1932 | Denslow | 95—96 |
| 2,327,733 | 8/1943 | Moore | 95—96 |
| 2,829,576 | 4/1958 | Debrie | 95—96 |
| 2,912,915 | 11/1959 | Hiserman | 95—94 |
| 3,000,288 | 9/1961 | Winnek | 95—96 XR |

NORTON ANSHER, Primary Examiner

FRED L. BRAUM, Assistant Examiner